US007421114B1

(12) United States Patent
Brandt

(10) Patent No.: US 7,421,114 B1
(45) Date of Patent: Sep. 2, 2008

(54) ACCELERATING THE BOOSTING APPROACH TO TRAINING CLASSIFIERS

(75) Inventor: Jonathan Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 604 days.

(21) Appl. No.: 10/995,461

(22) Filed: Nov. 22, 2004

(51) Int. Cl.
*G06K 9/62* (2006.01)

(52) U.S. Cl. ............... 382/159; 382/156; 382/170; 382/224; 706/6; 706/20

(58) Field of Classification Search .......... 382/159, 382/170, 224, 156; 706/12, 20
See application file for complete search history.

(56) References Cited

U.S. PATENT DOCUMENTS

| 7,076,473 | B2 * | 7/2006 | Moghaddam | 706/20 |
|---|---|---|---|---|
| 7,286,707 | B2 * | 10/2007 | Liu et al. | 382/190 |
| 2003/0110147 | A1 * | 6/2003 | Li et al. | 706/1 |
| 2004/0066966 | A1 * | 4/2004 | Schneiderman | 382/159 |
| 2004/0186816 | A1 * | 9/2004 | Lienhart et al. | 706/20 |
| 2005/0102246 | A1 * | 5/2005 | Movellan et al. | 706/12 |
| 2006/0062451 | A1 * | 3/2006 | Li et al. | 382/159 |
| 2006/0147107 | A1 * | 7/2006 | Zhang et al. | 382/159 |
| 2006/0222239 | A1 * | 10/2006 | Bargeron et al. | 382/159 |
| 2006/0248029 | A1 * | 11/2006 | Liu et al. | 706/20 |
| 2006/0269157 | A1 * | 11/2006 | Eruhimov et al. | 382/254 |
| 2007/0101269 | A1 * | 5/2007 | Hua et al. | 715/723 |
| 2007/0110308 | A1 * | 5/2007 | Hwang et al. | 382/170 |

OTHER PUBLICATIONS

Rob Schapire, "The Boosting Approach to Machine Learning," Princeton University, www.cs.princeton.edu/~schapire , 32 pages, 2002.
Paul Viola et al., "Robust Real-time Object Detection," Compaq, Cambridge Research Laboratory, Technical Report Series, CRL 2001/01, 30 pages, Feb. 2001.
Ron Meir et al., "An Introduction to Boosting and Leveraging," Dept. of Electrical Engineering, Technion, Haifa 3200, Israel, Research School of Information Sciences & Engineering, http://www-ee.technion.ac.il/~rmeir, (66 pages), 2003.
Yoav Freund et al., "A Decision-TheoreticGeneralization of On-Line Learning and an Application to Boosting," *Journal of Computer and System Sciences*, 55:119-139, (1997),Article No. SS971504.

(Continued)

*Primary Examiner*—Gregory M Desire
(74) *Attorney, Agent, or Firm*—Fish & Richardson P.C.

(57) ABSTRACT

Systems, methods, and computer program products implementing techniques for training classifiers. The techniques include receiving a training set that includes positive images and negative images, receiving a restricted set of linear operators, and using a boosting process to train a classifier to discriminate between the positive and negative images. The boosting process is an iterative process. The iterations include a first iteration where a classifier is trained by (1) testing some, but not all linear operators in the restricted set against a weighted version of the training set, (2) selecting for use by the classifier the linear operator with the lowest error rate, and (3) generating a re-weighted version of the training set. The iterations also include subsequent iterations during which another classifier is trained by repeating steps (1), (2), and (3), but using in step (1) the re-weighted version of the training set generated during a previous iteration.

30 Claims, 5 Drawing Sheets

OTHER PUBLICATIONS

Yang, Ming-Hsuan, et al., "Detecting Faces in Images: A Survey," IEEE Transactions on Pattern Analysis and Machine Intelligence, vol. 24, No. 1, Jan. 2002, 25 pages.

Duda, Richard O., et al., "Pattern Classification and Scene Analysis," John Wiley & Sons, Inc., © 1973, ISBN 0-471-22361-1, *the entire book*.

* cited by examiner

ACCELERATING THE BOOSTING APPROACH TO TRAINING CLASSIFIERS

BACKGROUND OF THE INVENTION

The present invention relates to machine learning and more specifically to training a machine to classify images according to whether or not they correspond to an object of interest. A good example of an object of interest is a person's face. The images can be entire images or sub-regions of larger images.

One training technique involves obtaining a set of positive images that correspond to the object of interest and a set of negative images that do not correspond to the object of interest, and training the machine to distinguish between the two sets of images. This training technique is referred to as "supervised learning".

One approach to performing supervised learning is known as "boosting." Boosting is based on the principle of the committee machine. That principle states that the results of multiple, independently trained classifiers can be combined to obtain an aggregate classifier with an overall error rate that is lower than that of any of the individual classifiers.

Boosting is an iterative training process. During each iteration, an individual classifier is trained and the trained classifier is added to the aggregate classifier. The training process ends when a pre-defined stopping condition is reached. For example, the stopping condition can be a target accuracy level for the aggregate classifier or a maximum time interval for the training process.

Boosting is a well-known technique. The boosting technique was presented at the Mathematical Sciences Research Institute Workshop on Nonlinear Estimation and Classification in 2002 and is also described in the paper, "The boosting approach to machine learning: an overview", by Robert Shapire and published at: http://www.cs.princeton.edu/~schapire/publist.html. The contents of this paper are incorporated herein by reference.

A common form of boosting is known as Adaboost. The Adaboost technique was developed by Yoav Freund and Robert Shapire and is described in the paper, "A decision-theoretic generalization of on-line learning and an application to boosting", Journal of Computer and System Sciences, Volume 55(1), pages 119-139, August 1997. The contents of this paper are incorporated herein by reference.

The Adaboost algorithm has been applied successfully to a number of machine learning problems. In particular, it has been applied to image classification, as described in the paper, "Robust Real-Time Object Detection", by Paul Viola and Michael J. Jones International Conference on Computer Vision, presented at IEEE Computer Society's 2001 International Conference on Computer Vision, and also published at: http://www.hpl.hp.com/techreports/Compaq-DEC/CRL-2001-1.html. The application of Adaboost to image classification is also described in the paper, "Rapid Object Detection using a Boosted Cascade of Simple Features", presented at IEEE Computer Society's 2001 Computer Vision and Pattern Recognition Conference. The contents of both of these papers are incorporated herein by reference.

Other forms of boosting exist, for example, bagging, arcing and leveraging. These techniques are described further in the paper "An Introduction to Boosting and Leveraging", by Ron Meir and Gunnar Raetsch and published at: http://www-.boosting.org/papers/MeiRae03.pdf, and also published in Lecture Notes In Artificial Intelligence, Advanced Lectures On Machine Learning Archive, pages 118-183, 2003. The contents of this paper are incorporated herein by reference.

A classifier that is trained using boosting is typically very fast at classifying images. However, the training process is extremely slow, thereby limiting the applicability of boosting as a technique for training classifiers.

SUMMARY OF THE INVENTION

The invention provides systems, methods, and computer program products implementing techniques for training a classifier. In one aspect, the techniques include receiving a training set that includes images that correspond to an object of interest (positive images) and images that do not correspond to an object of interest (negative images), receiving a restricted set of linear operators, and using a boosting process to train a classifier to discriminate between the positive and negative images in the training set. The classifier is an aggregate of multiple individual classifiers. The boosting process is an iterative process. The iterations include a first iteration where an individual classifier in the aggregate is trained by (1) testing some, but not all linear operators in the restricted set against a weighted version of the training set, (2) selecting for use by the individual classifier the linear operator with the lowest error rate (error-minimizing operator), and (3) generating a re-weighted version of the training set that is weighted such that images that were misclassified by the error-minimizing operator are weighted more than images that were classified correctly by the error-minimizing operator. The iterations also include subsequent iterations during which another individual classifier in the aggregate is trained by repeating steps (1), (2), and (3), but using in step (1) the re-weighted version of the training set generated during a previous iteration.

The invention can be implemented to include one or more of the following features:

The restricted set of operators includes only rectangle-type operators, a rectangle-type operator being a linear operator that computes a difference among two or more rectangular regions of an image.

The restricted set of operators includes one or more of the following types of linear operators: wavelet families, Gabor filters, Laplacian of Gaussian masks, edge and corner detectors.

Testing some, but not all of the operators includes computing a relevance estimate for each operator in the restricted set of operators, the relevance estimate being an estimate of how accurately the operator can discriminate between the positive images and the negative images in the training set, ranking the operators according to their relevance estimate, and testing only the operators above a threshold ranking.

Computing the relevance estimate for each operator includes computing mean and standard deviation statistics for positive and negative images in the training set, computing a separation vector for the training set using the mean and standard deviation statistics, and computing the relevance estimate for the operator using the separation vector.

The separation vector represents the pixel-wise separability between the positive images and negative images in the training set.

The separation vector is a vector of separation values computed according to the following mathematical formula: $s^{(k)} = (m_P^{(k)} - m_N^{(k)})/\max(\sigma_P^{(k)}, \sigma_N^{(k)})$, where:

s is the separation vector, $s^{(k)}$ is the separation value for a given pixel k, $m_P^{(k)}, m_N^{(k)}$ is the mean for a given pixel k for the positive images P and the negative images N, respectively, in the training set, and $\sigma_P^{(k)}, \sigma_N^{(k)}$ is the standard deviation for a given pixel k for the positive images P and the negative images N, respectively, in the training set.

Computing the relevance estimate for the operator using the separation vector includes multiplying the operator against separation vector.

The iterations further include at least one iteration where a classifier in the aggregate is trained by testing all the operators in the restricted set of operators.

The object of interest is a face or portion thereof.

The invention can be implemented to realize one or more of the following advantages:

The time required to train a classifier using the boosting process is reduced. Training that typically takes several weeks can be completed in less than a day. This increases the applicability of boosting as a method for training classifiers. This also increases the scope and accuracy of the boosting technique because it allows for use of a larger training set and operator set during training.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

Figure 1:
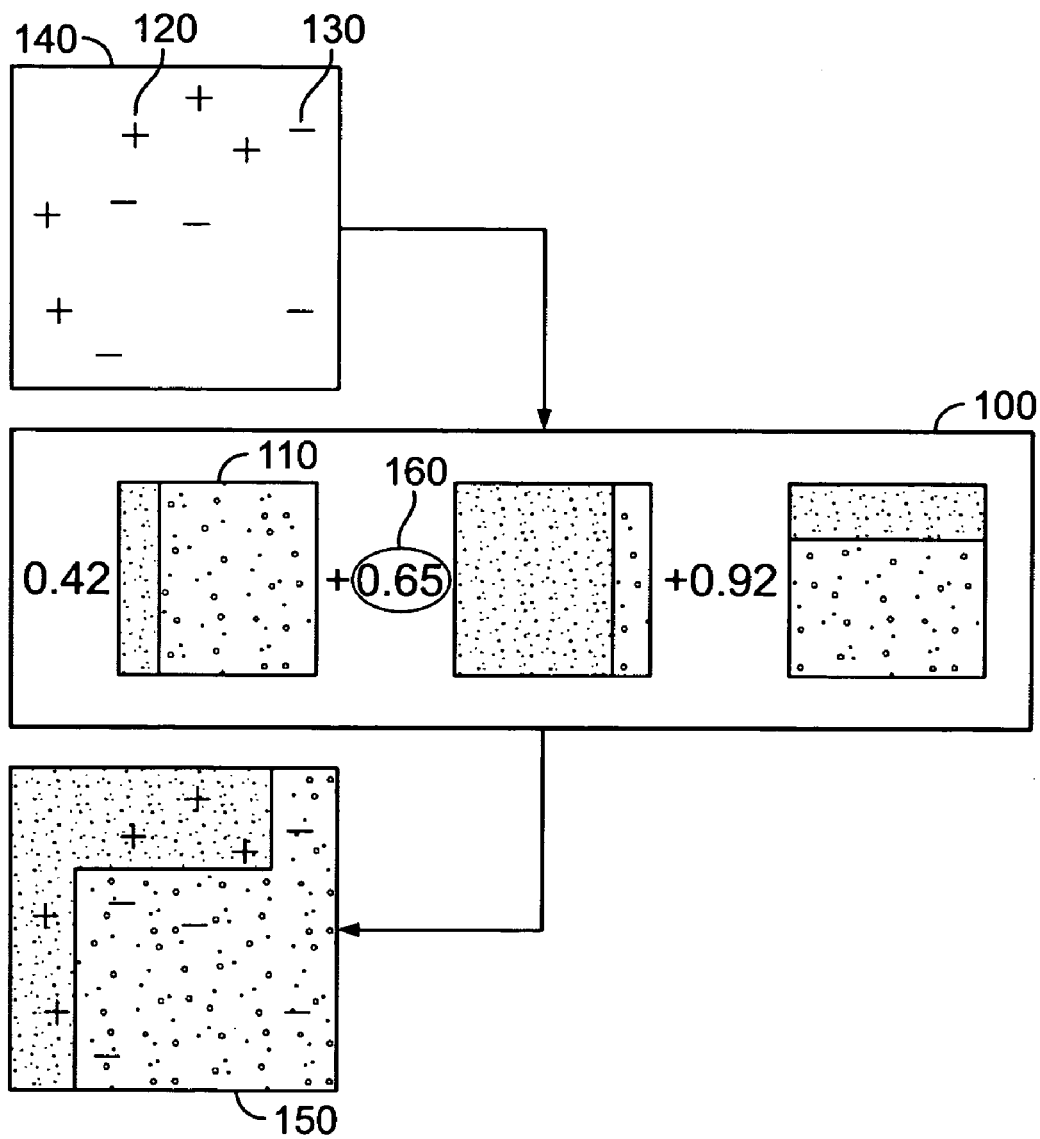
FIG. 1 illustrates an aggregate classifier.

FIG. 1 illustrates an aggregate classifier 100 that includes multiple individual classifiers 110. Each individual classifier 110 within the aggregate classifier 100 is trained to discriminate between positive images 120 and negative images 130 in a training set 140.

The outputs from the individual classifiers are combined to produce the final output 150 for the aggregate classifier. In the example shown in FIG. 1, the individual classifier outputs are combined using a weighted summation function, where each individual output is weighted according to a strength factor 160 that represents the accuracy level of that individual classifier.

Figure 2:
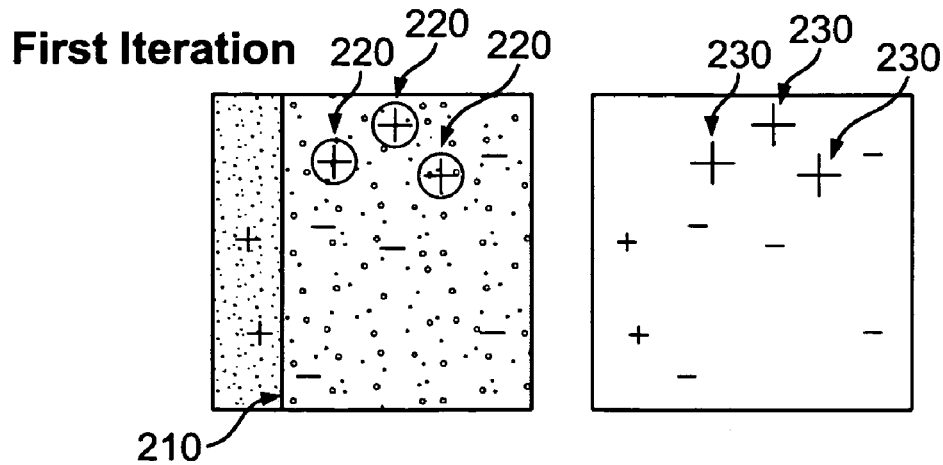
FIG. 2 illustrates a boosting technique for training the aggregate classifier.
Figure 2:
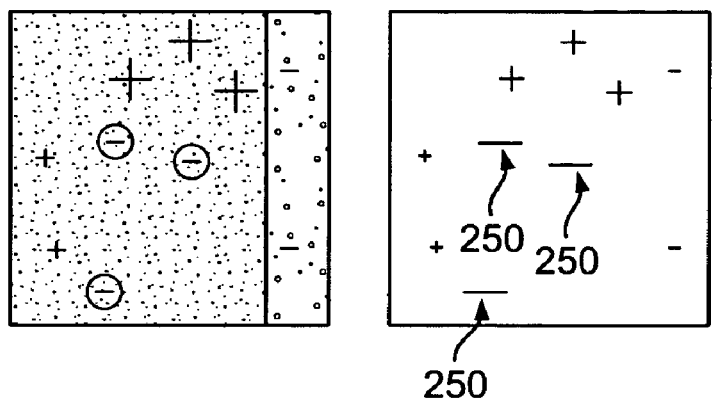
Figure 2:
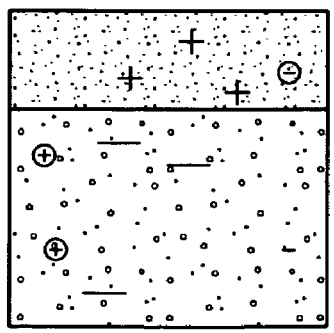

The individual classifiers 110 are trained using an iterative boosting technique 200 illustrated in FIG. 2. During each iteration, an individual classifier is trained against a weighted version of the training set. As will be described further below, the training set is weighted such that the harder-to-classify images are weighted more than the easier-to-classify images.

Figure 4:
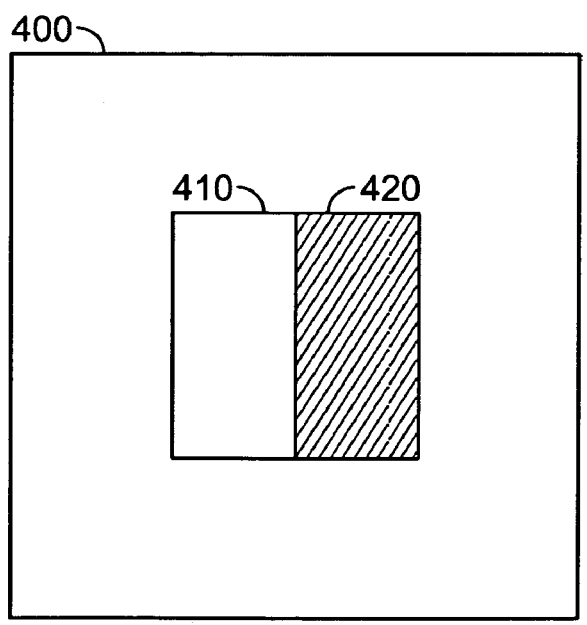
FIG. 4 illustrates a rectangle-type linear operator.
Figure 5:
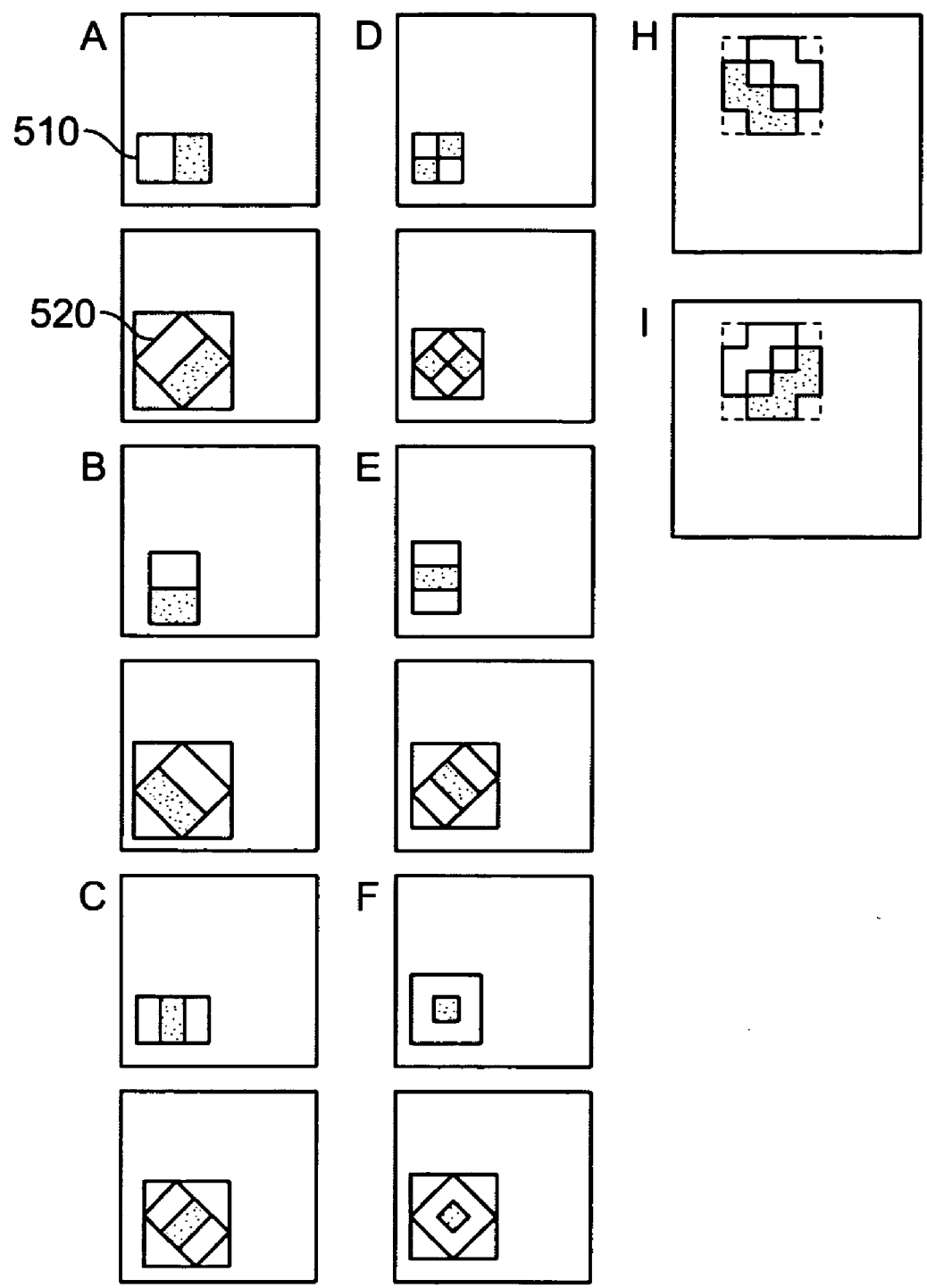
FIG. 5 illustrates several different rectangle-type linear operators.

During each iteration, the individual classifier being trained selects a linear operator from a restricted set of linear operators. One type of linear operator, illustrated in FIG. 4, is an operator that computes a difference among two or more rectangular regions 410, 420 of an image 400. Such a linear operator will be referred to as a rectangle-type operator. FIG. 5 illustrates several different rectangle-type operators, labeled A through I. For each of the operators labeled A through F, two versions of the operator are shown, one version 510 that is aligned with the vertical axis of the image, and another version 520 that is aligned with the diagonal axis of the image.

In one implementation, the restricted set of linear operators is composed entirely of rectangle-type operators. In an alternative implementation, the restricted set of linear operators includes other types of linear operators besides rectangle-type operators. Other types of linear operators include wavelet families, Gabor filters, Laplacian of Gaussian masks and edge and corner detectors.

The individual classifier selects the linear operator (and threshold value for use with the linear operator) that produces the most accurate partition 210 (FIG. 2) of the weighted training set. In other words, it selects the linear operator that can separate the positive images from the negative images with the least amount of classification error with respect to the training set. Such a linear operator will be referred to as the error-minimizing operator. In one implementation, the classification error is computed by taking the sum of the weights of the misclassified images.

The training set is then reweighted such that the images 220, that the current classifier misclassified, are boosted 230 in importance. The effect of this boosting, or reweighting is to focus the learning on the difficult-to-classify cases.

The weighted training set is then used in a subsequent iteration 240 to train another classifier. At the end of the subsequent iteration, the training set is again reweighted 250 and the reweighted training set is used in the next subsequent iteration 260.

Because the weighting of the training set changes for each iteration, the error-minimizing operator will be different for each iteration. The following paragraphs describe how to compute the error-minimizing operator.

Conventionally, in the prior art, the error-minimizing operator is computed by testing each operator in the restricted operator set against the entire training set. The conventional approach can be very slow because typically the restricted operator set is very large, for example, more than 100,000 operators, and the training set is also very large, typically 10,000 to 20,000 images.

Figure 3:
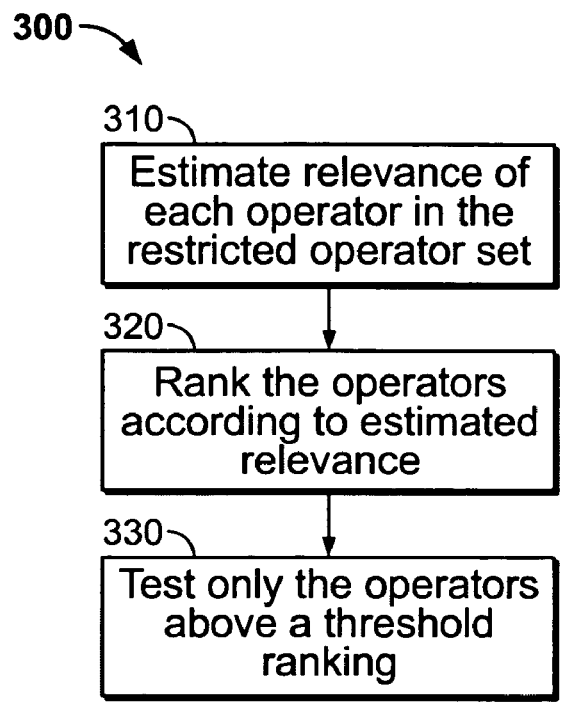
FIG. 3 illustrates an accelerated boosting technique.

FIG. 3 illustrates an accelerated approach of the invention to computing the error-minimizing operator. In the accelerated approach, not all of the operators in the restricted operator set are tested against the training set. Instead, the accelerated method disregards the vast majority of the operators in the restricted set and only tests a small subset of the operators.

As illustrated by method 300 of FIG. 3, the operators that are tested are selected by computing a relevance estimate for each of the operators in the restricted set of operators (step 310). The relevance estimate for a given operator is an estimation of how accurately the operator can discriminate between the positive images and negative images in the training set. A technique for estimating the relevance of an operator will be described below.

The operators are then ranked according to their estimated relevance (step 320) and only the operators above a threshold ranking are tested (step 330). As will be described further below, the threshold can be varied.

Operator Relevance Estimation

Figure 6:
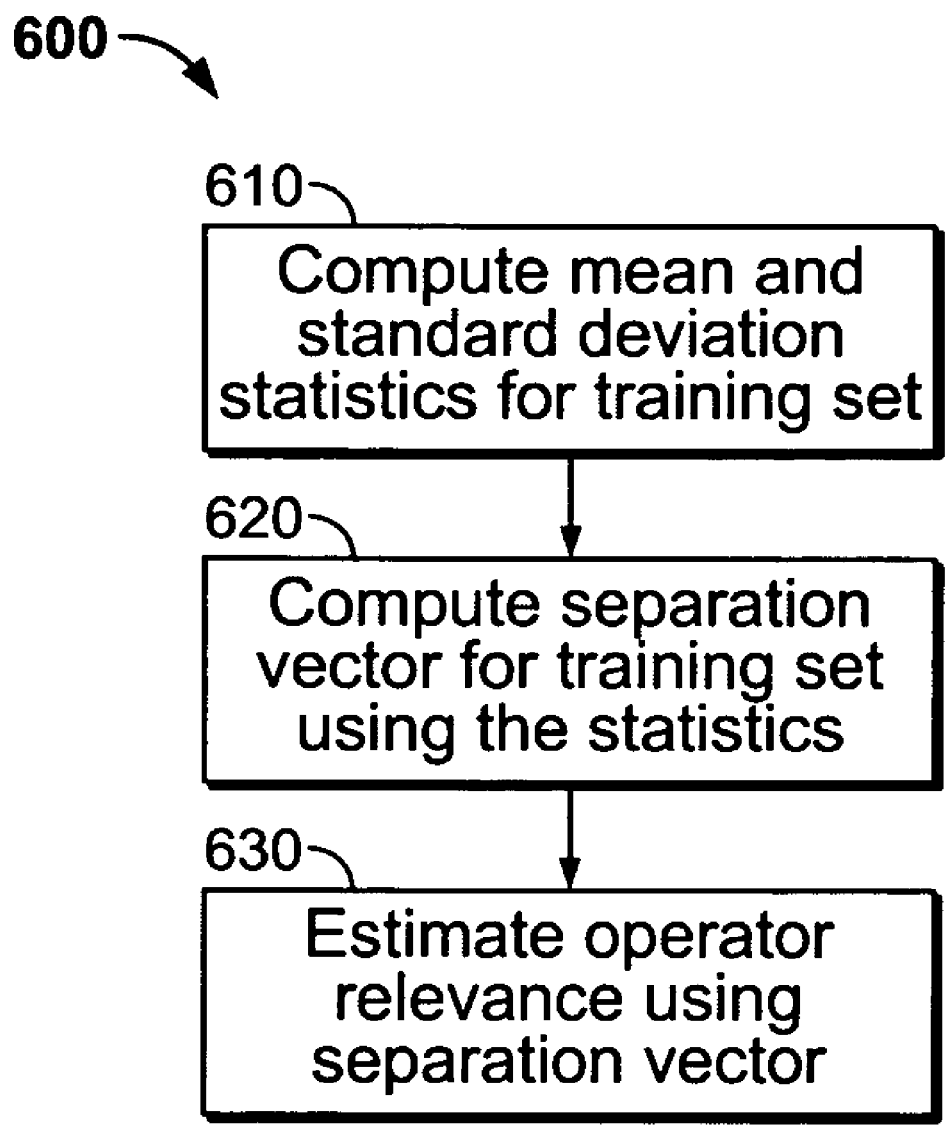
FIG. 6 illustrates a technique for estimating operator relevance.

As shown in FIG. 6, a low-cost technique 600 for estimating the operator relevance involves first computing the mean and standard deviation statistics for the training set (step 610), and then using the mean and standard deviation statistics to compute a separation vector for the training set (step 620), and finally using the separation vector to compute the operator relevance estimate (step 560), as will be described in more detail below.

The mean and standard deviation statistics can be computed as follows:

Assume the training set $T=\{x_1, x_2, \ldots, x_m\}$ is partitioned into two disjoint subsets $T_P$ and $T_N$, respectively consisting of the positive and negative images. Each image $x_i$ is a vector $[x_i^{(1)}, x_i^{(2)}, \ldots, x_i^{(n)}]$ of pixels and has an associated weight $w_i$.

Let $$m_z = \sum_{x_i \in T_z} w_i x_i / W_z$$

where $$W_z = \sum_{x_i \in T_z} w_i$$

for $Z \in \{P,N\}$ the weighted positive and negative image means, and let $$\sigma_z^{(k)} = \left[\sum_{x_i \in T_z} w_i \left(x_i^{(k)} - m_z^{(k)}\right)^2 / W_z\right]^{\frac{1}{2}}$$

be the pixel-wise weighted positive and negative standard deviations.

Using the computed standard deviation and mean statistics, one can compute a separation vector that represents the pixel-wise separability between the positive images and the negative images in the training set. The separation vector makes the simplifying assumption that the pixels of images in the training set are independent from one another. The separation vector can be computed as follows:

$$s^{(k)} = (m_P^{(k)} - m_N^{(k)}) / \max(\sigma_P^{(k)}, \sigma_N^{(k)})$$

where:
s=the separation vector,
$s^{(k)}$=the separation value for a given pixel k,
$m_P^{(k)}, m_N^{(k)}$=the mean for a given pixel k for the positive images P and the negative images N, respectively, and
$\sigma_P^{(k)}, \sigma_N^{(k)}$=the standard deviation for a given pixel k for the positive images P and the negative images N, respectively.

The separation value for a given pixel is negative if the positive images are generally darker at the given pixel than the negative images. The separation value is positive for a given pixel if the reverse is true. The separation value, $s^{(k)}$, is a rating of the relevance of the pixel k with respect to the problem of discriminating the positive images from the negative images in the training set. For instance, if a given pixel k is statistically uncorrelated with either the positive or negative examples, then the pixel's positive mean value ($m_P^{(k)}$) will be equal to its negative mean value ($m_N^{(k)}$) and the separation value for the given pixel will be zero. If the pixel's positive mean value and negative mean value are not equal, then the given pixel is correlated in some way with the positive and negative images and consequently the pixel can potentially contribute to discriminating between the positive images and the negative images. In the case of linear operators, the degree of the pixel's potential contribution is directly proportional to the difference between the pixel's positive and negative mean values, and is inversely proportional to the pixel's positive and negative standard deviation values ($\sigma_P^{(k)}, \sigma_N^{(k)}$). Intuitively, a pixel with a larger standard deviation is less relevant to discrimination because its value is less consistent within the positive and negative image subsets.

Using the separation vector, the relevance estimate for each operator in the restricted operator set can be computed as follows:

$$v_j = |f_j^T s|.$$

where $v_j$ is the relevance estimate of an operator $f_j$. In essence, this computation compares the operator against the separability values of the separation vector and returns a relevance estimate that represents how correlated the operator is with the separation vector. Operators that are more correlated are more likely to be effective at discriminating the positive images from the negative images in the training set.

In summary, during each iteration of the training, the training set statistics $m_Z$ and $\sigma_Z$ are evaluated based on the current training weights. The separation vector is computed from those statistics and the relevance estimate for each operator in the restricted operator set is computed. The relevance estimate is then used to select the top k-th percentile operators, and these selected operators are then tested to identify the error-minimizing operator from among the selected operators.

Since the testing step dominates the computational time required to perform the boosting process, the optimization achieved by only testing the top k-th percentile operators results in a speed-up of approximately 100/k.

Therefore, the choice of an appropriate value for k becomes important. Smaller k results in greater speed-up but also greater risk of inaccuracy. The reason for the greater risk of inaccuracy is that the relevance estimate used to rank the operators is merely an estimate. Thus, the global error-minimizing operator within the entire restricted operator set may not necessarily be ranked within the top k-th percentile.

However, boosting does not require that a global error-minimizing operator be selected. Instead, boosting merely requires selection of an operator that has less than a 50% error rate. Nevertheless, the lower the error rate of the selected operator, the more efficient the resulting classifier will be. Therefore, the choice of value for k results in a tradeoff between learning speed and classifier efficiency. In practice, k=5 is a good tradeoff between speed and efficiency.

In one implementation, the accelerated boosting technique described above can be used in conjunction with conventional boosting techniques. For example, the accelerated technique can be used for most iterations of the training. But for some iterations, (for example, for every tenth iteration), the conventional technique can be used instead. The combined approach enables the boosting algorithm to dynamically adjust the value of k in order to assure a bounded difference between the error within the restricted set and the error over the entire set. For example, suppose that on every $10^{th}$ iteration, both error values are obtained. If the difference between the two errors exceeds a maximum threshold, then the value of k can be increased. Conversely, if the error is less than a minimum threshold, then the value of k can be decreased. The combined approach is much faster than the conventional approach to boosting and although the combined approach is slower than the accelerated approach in most cases, the combined approach assures an upper bound on the suboptimality of the selected operator. Also, in some cases, the combined approach allows the boosting algorithm to run faster than the accelerated approach by dynamically lowering the k value when warranted.

The above-described boosting techniques can be used to train classifiers for a variety of different applications, including but not limited to classifying textual or graphical data, for example in the fields of data mining or image recognition, and classifying audio data, for example in the fields of telecommunications.

The invention and all of the functional operations described in this specification can be implemented in digital electronic circuitry, or in computer software, firmware, or hardware, including the structural means disclosed in this specification and structural equivalents thereof, or in combinations of them. For example, the invention can be implemented in embedded systems (e.g., a camera, cell phone, onboard computers, robots) and also in a GPU (graphics processing unit).

The invention can be implemented as one or more computer program products, i.e., one or more computer programs tangibly embodied in an information carrier, e.g.; in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular implementations. Other implementations are within the scope of the following claims. For example, the steps of the invention can be performed in a different order and still achieve desirable results.

What is claimed is:

1. A method for training a classifier, the method comprising:

receiving a training set that includes images that correspond to an object of interest (positive images) and images that do not correspond to an object of interest (negative images);

receiving a restricted set of linear operators; and using a boosting process to train a classifier to discriminate between the positive and negative images in the training set, the classifier being an aggregate of multiple individual classifiers, the boosting process being an iterative process, the iterations including:

a first iteration where an individual classifier in the aggregate is trained by:

(1) testing some, but not all linear operators in the restricted set against a weighted version of the training set;

(2) selecting for use by the individual classifier the linear operator with the lowest error rate (error-minimizing operator); and (3) generating a re-weighted version of the training set that is weighted such that images that were misclassified by the error-minimizing operator are weighted more than images that were classified correctly by the error-minimizing operator; and subsequent iterations during which another individual classifier in the aggregate is trained by repeating steps (1), (2), and (3), but using in step (1) the re-weighted version of the training set generated during a previous iteration.

2. The method of claim 1, wherein:

the restricted set of operators includes only rectangle-type operators, a rectangle-type operator being a linear operator that computes a difference among two or more rectangular regions of an image.

3. The method of claim 1, wherein:

the restricted set of operators includes one or more of the following types of linear operators: wavelet families, Gabor filters, Laplacian of Gaussian masks, edge and corner detectors.

4. The method of claim 1, wherein testing some, but not all of the operators includes:

computing a relevance estimate for each operator in the restricted set of operators, the relevance estimate being an estimate of how accurately the operator can discriminate between the positive images and the negative images in the training set;

ranking the operators according to their relevance estimate; and testing only the operators above a threshold ranking.

5. The method of claim 4, wherein computing the relevance estimate for each operator includes:
computing mean and standard deviation statistics for positive and negative images in the training set;
computing a separation vector for the training set using the mean and standard deviation statistics; and
computing the relevance estimate for the operator using the separation vector.

6. The method of claim 5, wherein the separation vector represents the pixel-wise separability between the positive images and negative images in the training set.

7. The method of claim 5, wherein the separation vector is a vector of separation values computed according to the following mathematical formula:

$$s^{(k)} = (m_P^{(k)} - m_N^{(k)}) / \max(\sigma_P^{(k)}, \sigma_N^{(k)}),$$

wherein:
s is the separation vector,
$s^{(k)}$ is the separation value for a given pixel k,
$m_P^{(k)}, m_N^{(k)}$ is the mean for a given pixel k for the positive images P and the negative images N, respectively, in the training set, and
$\sigma_P^{(k)}, \sigma_N^{(k)}$ is the standard deviation for a given pixel k for the positive images P and the negative images N, respectively, in the training set.

8. The method of claim 5, wherein computing the relevance estimate for the operator using the separation vector includes:
multiplying the operator against separation vector.

9. The method of claim 1, wherein:
the iterations further include at least one iteration where the individual classifier is trained by testing all the operators in the restricted set of operators.

10. The method of claim 1, wherein:
the object of interest is a face or portion thereof.

11. A computer program product, tangibly embodied in a computer-readable storage medium, for training a classifier, the product being operable to cause data processing apparatus to perform operations comprising:
receiving a training set that includes images that correspond to an object of interest (positive images) and images that do not correspond to an object of interest (negative images);
receiving a restricted set of linear operators; and
using a boosting process to train a classifier to discriminate between the positive and negative images in the training set, the classifier being an aggregate of multiple individual classifiers, the boosting process being an iterative process, the iterations including:
a first iteration where an individual classifier in the aggregate is trained by:
(1) testing some, but not all linear operators in the restricted set against a weighted version of the training set;
(2) selecting for use by the individual classifier the linear operator with the lowest error rate (error-minimizing operator); and
(3) generating a re-weighted version of the training set that is weighted such that images that were misclassified by the error-minimizing operator are weighted more than images that were classified correctly by the error-minimizing operator; and
subsequent iterations during which another individual classifier in the aggregate is trained by repeating steps (1), (2), and (3), but using in step (1) the re-weighted version of the training set generated during a previous iteration.

12. The computer program product of claim 11, wherein:
the restricted set of operators includes only rectangle-type operators, a rectangle-type operator being a linear operator that computes a difference among two or more rectangular regions of an image.

13. The computer program product of claim 11, wherein:
the restricted set of operators includes one or more of the following types of linear operators: wavelet families, Gabor filters, Laplacian of Gaussian masks, edge and corner detectors.

14. The computer program product of claim 11, wherein testing some, but not all of the operators includes:
computing a relevance estimate for each operator in the restricted set of operators, the relevance estimate being an estimate of how accurately the operator can discriminate between the positive images and the negative images in the training set;
ranking the operators according to their relevance estimate; and
testing only the operators above a threshold ranking.

15. The computer program product of claim 14, wherein computing the relevance estimate for each operator includes:
computing mean and standard deviation statistics for positive and negative images in the training set;
computing a separation vector for the training set using the mean and standard deviation statistics; and
computing the relevance estimate for the operator using the separation vector.

16. The computer program product of claim 15, wherein the separation vector represents the pixel-wise separability between the positive images and negative images in the training set.

17. The computer program product of claim 15, wherein the separation vector is a vector of separation values computed according to the following mathematical formula:

$$s^{(k)} = (m_P^{(k)} - m_N^{(k)}) / \max(\sigma_P^{(k)}, \sigma_N^{(k)}),$$

wherein:
s is the separation vector,
$s^{(k)}$ is the separation value for a given pixel k,
$m_P^{(k)}, m_N^{(k)}$ is the mean for a given pixel k for the positive images P and the negative images N, respectively, in the training set, and
$\sigma_P^{(k)}, \sigma_N^{(k)}$ is the standard deviation for a given pixel k for the positive images P and the negative images N, respectively, in the training set.

18. The computer program product of claim 15, wherein computing the relevance estimate for the operator using the separation vector includes:
multiplying the operator against separation vector.

19. The computer program product of claim 11, wherein:
the iterations further include at least one iteration where the individual classifier is trained by testing all the operators in the restricted set of operators.

20. The computer program product of claim 11, wherein:
the object of interest is a face or portion thereof.

21. A system comprising:
means for receiving a training set that includes images that correspond to an object of interest (positive images) and images that do not correspond to an object of interest (negative images);
means for receiving a restricted set of linear operators; and
means for using a boosting process to train a classifier to discriminate between the positive and negative images in the training set, the classifier being an aggregate of multiple individual classifiers, the boosting process being an iterative process, the iterations including:

a first iteration where an individual classifier in the aggregate is trained by:
- (1) testing some, but not all linear operators in the restricted set against a weighted version of the training set;
- (2) selecting for use by the individual classifier the linear operator with the lowest error rate (error-minimizing operator); and
- (3) generating a re-weighted version of the training set that is weighted such that images that were misclassified by the error-minimizing operator are weighted more than images that were classified correctly by the error-minimizing operator; and subsequent iterations during which another individual classifier in the aggregate is trained by repeating steps (1), (2), and (3), but using in step (1) the re-weighted version of the training set generated during a previous iteration.

22. The system of claim 21, wherein:
the restricted set of operators includes only rectangle-type operators, a rectangle-type operator being a linear operator that computes a difference among two or more rectangular regions of an image.

23. The system of claim 21, wherein:
the restricted set of operators includes one or more of the following types of linear operators: wavelet families, Gabor filters, Laplacian of Gaussian masks, edge and corner detectors.

24. The system of claim 21, wherein testing some, but not all of the operators includes:
computing a relevance estimate for each operator in the restricted set of operators, the relevance estimate being an estimate of how accurately the operator can discriminate between the positive images and the negative images in the training set;
ranking the operators according to their relevance estimate; and
testing only the operators above a threshold ranking.

25. The system of claim 24, wherein computing the relevance estimate for each operator includes:
computing mean and standard deviation statistics for positive and negative images in the training set;
computing a separation vector for the training set using the mean and standard deviation statistics; and
computing the relevance estimate for the operator using the separation vector.

26. The system of claim 25, wherein the separation vector represents the pixel-wise separability between the positive images and negative images in the training set.

27. The system of claim 25, wherein the separation vector is a vector of separation values computed according to the following mathematical formula:

$$s^{(k)} = (m_P^{(k)} - m_N^{(k)}) / \max(\sigma_P^{(k)}, \sigma_N^{(k)}),$$

wherein:
s is the separation vector,
$s^{(k)}$ is the separation value for a given pixel k,
$m_P^{(k)}, m_N^{(k)}$ is the mean for a given pixel k for the positive images P and the negative images N, respectively, in the training set, and
$\sigma_P^{(k)}, \sigma_N^{(k)}$ is the standard deviation for a given pixel k for the positive images P and the negative images N, respectively, in the training set.

28. The system of claim 25, wherein computing the relevance estimate for the operator using the separation vector includes:
multiplying the operator against separation vector.

29. The system of claim 21, wherein:
the iterations further include at least one iteration where the individual classifier is trained by means for testing all the operators in the restricted set of operators.

30. The system of claim 21, wherein:
the object of interest is a face or portion thereof.

* * * * *

UNITED STATES PATENT AND TRADEMARK OFFICE
CERTIFICATE OF CORRECTION

PATENT NO. : 7,421,114 B1
APPLICATION NO. : 10/995461
DATED : September 2, 2008
INVENTOR(S) : Jonathan Brandt It is certified that error appears in the above-identified patent and that said Letters Patent is hereby corrected as shown below:

Claim 7:
    column 9, line 18:
        delete " $s^{(k)} = (m_P^{(k)} - m_N^{(k)}) / \max(\sigma_P^{(k)}, \sigma_N^{(k)})$ ", and replace with -- $s^{(k)} = (m_P^{(k)} - m_N^{(k)}) / \max(\sigma_P^{(k)}, \sigma_N^{(k)})$ --

Claim 17:
    column 10, line 39:
        delete " $s^{(k)} = (m_P^{(k)} - m_N^{(k)}) / \max(\sigma_P^{(k)}, \sigma_N^{(k)})$ ", and replace with -- $s^{(k)} = (m_P^{(k)} - m_N^{(k)}) / \max(\sigma_P^{(k)}, \sigma_N^{(k)})$ --

Signed and Sealed this

Fifth Day of May, 2009

JOHN DOLL
*Acting Director of the United States Patent and Trademark Office*